Nov. 10, 1953 J. F. HONEY 2,659,051
CARRIER INSERTION
Filed April 29, 1952
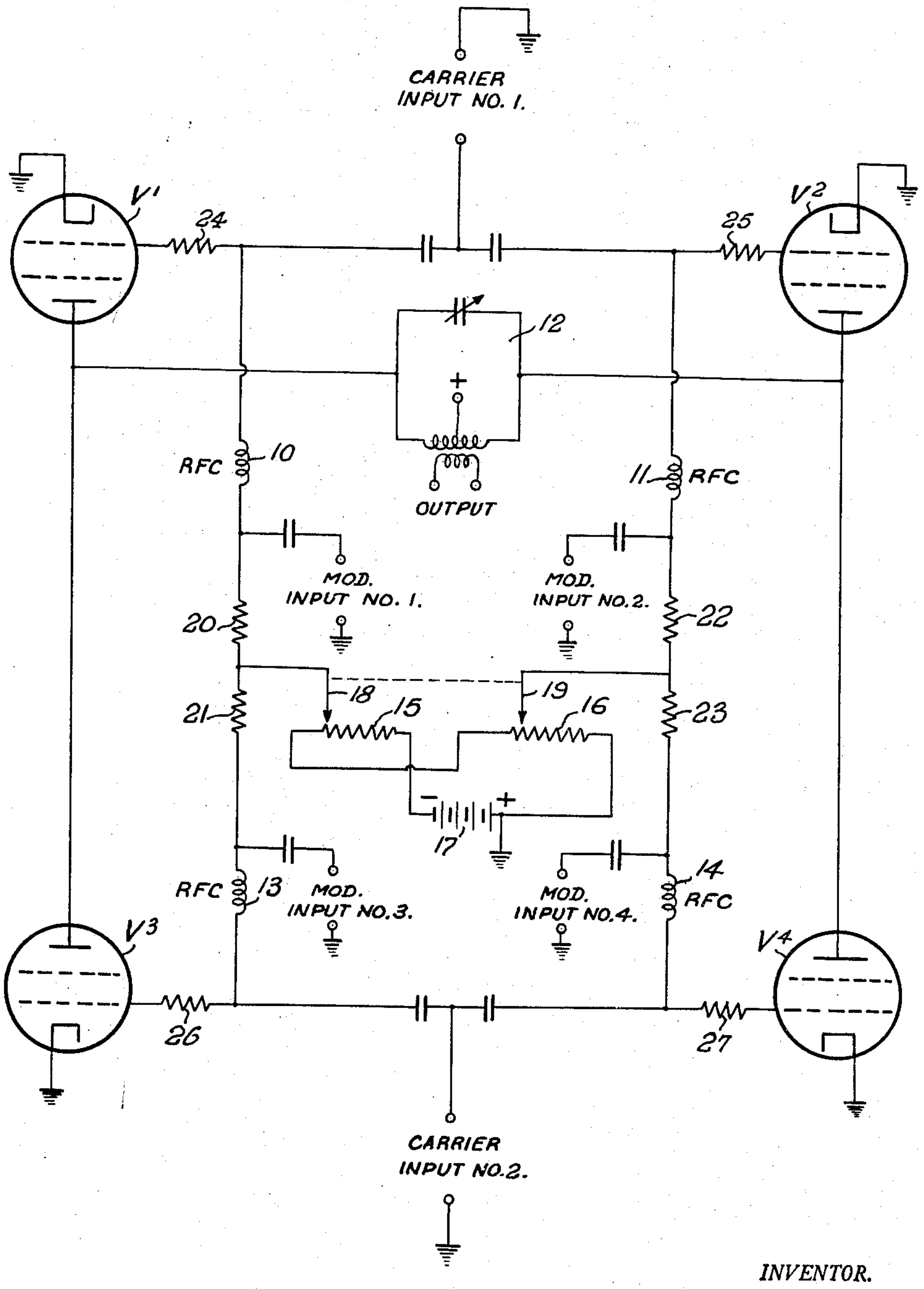
INVENTOR.
JOHN F. HONEY
BY
Harry M. Saragovitz
ATTORNEY Patented Nov. 10, 1953

2,659,051

UNITED STATES PATENT OFFICE 2,659,051

CARRIER INSERTION

John F. Honey, Menlo Park, Calif., assignor to the United States of America as represented by the Secretary of the Army Application April 29, 1952, Serial No. 285,032

5 Claims. (Cl. 332—45)

My invention relates to a double balanced modulating system whose output contains but one sideband, the other sideband and the carrier being suppressed. Such a modulating system may comprise two balanced modulators with a common plate tank circuit. When such a system is supplied with modulating and carrier waves with the proper phase relationships, one sideband and the carrier are suppressed, leaving only the other sideband in the output.

When a double balanced modulating system comprises a component of a transmitter, it is often desired to transmit a small, but adjustable, amount of the carrier. There are many ways in which either modulator may be unbalanced so as to cause some carrier to appear in the output. However, many of these ways also result in unbalance between the two modulators, with the consequent introduction of the unwanted sideband.

It is an object of my invention to provide a means for introducing carrier into the output of a double balanced modulating system without introducing the unwanted sideband.

It is a further object of my invention to provide a means for adjusting the amount of carrier introduced, without disturbing the balance between the two modulators.

In accordance with my invention, I unbalance both modulators equally and simultaneously. This is accomplished by increasing the bias on one electrode of each of two tubes, one in each modulator, and simultaneously decreasing the bias on the remaining two tubes. Each modulator is thereby unbalanced and contributes equally to the production of carrier. However, the two modulators remain balanced with respect to each other, so that no unwanted sideband is produced.

For a more complete understanding of the invention, reference may be made to the accompanying drawing, the single figure of which is a simplified schematic diagram of a double balanced modulating system incorporating the invention therein.

Referring now to the drawing, tubes V1 and V2 and their associated circuits comprise one balanced modulator. The modulating signals are applied from modulation inputs Nos. 1 and 2 through radio frequency chokes 10 and 11. The signal applied to input No. 2 is 180 degrees out of phase with that applied to input No. 1. Carrier excitation from any suitable source is applied to the terminals marked carrier input No. 1. It is seen that the modulating signals are applied to the grids of tubes V1 and V2 in push pull, while the carrier is applied in phase. The output is taken from the common plate tank circuit 12. The circuit so far described comprises a balanced modulator which, when properly adjusted, will provide an output containing both sidebands but no carrier.

Tubes V3 and V4 comprise the other balanced modulator. Modulating signals are applied through radio frequency chokes 13 and 14 from modulation inputs Nos. 3 and 4. These signals are also 180 degrees out of phase with each other, and, furthermore, are 90 degrees out of phase with the signals applied to inputs Nos. 1 and 2. Considering the signal applied to input No. 1 as a reference, the signal applied to No. 2 is displaced 180 degrees; the signal applied to No. 3 is displaced 90 degrees; the signal applied to No. 4 is displaced 270 degrees. Carrier excitation, equal in magnitude but displaced in phase by 90 degrees from that applied to carrier input No. 1, is applied to carrier input No. 2. The anodes of tubes V3 and V4 are also connected to tank circuit 12. It will be understood that it is necessary to provide a source of positive potential for anodes and screens of the tubes. The screen potential of each tube should be individually adjustable. The connections for the anode and screen potentials are conventional, and have been omitted from the drawing for the sake of clarity.

The above described system, when properly adjusted, will provide an output containing but one sideband, the other sideband and the carrier being suppressed. If tube V1 is unbalanced with respect to V2, or if V3 is unbalanced with respect to V4, carrier as well as the wanted sideband will appear in the output. If the modulator comprising V1 and V2 is unbalanced with respect to the modulator comprising V3 and V4, the output will contain the unwanted sideband. In order to insert some carrier in the output without inserting the unwanted sideband, it is necessary to unbalance V1 with respect to V2, or V3 with respect to V4, or both, without unbalancing V1, V2 with respect to V3, V4.

In accordance with the invention, two resistors 15 and 16 are connected in series across a suitable source of direct current, shown schematically as a battery 17. Resistors 15 and 16 are provided with sliders 18 and 19 respectively, which are mechanically connected for simultaneous movement. Slider 18 is connected to the control grid of the tube V1 through resistor 20, choke 10 and resistor 24; and to the control grid of tube V3 through resistor 21, choke 13 and resistor 26. Slider 19 is connected to the control grid of tube V2 through resistor 22, choke 11 and resistor 25; and to the control grid of tube V4 through resistor 23, choke 14 and resistor 27. When sliders 18 and 19 are at their extreme left position, the bias on all four tubes will be equal. If the modulating system is otherwise balanced, a single sideband only will appear in the output. When sliders 18 and 19 are moved toward the right from the extreme left position, the control grid of tube V1 will become more negative, while the control grid of tube V2 will become more positive. Tube V1 is therefore unbalanced with respect to tube V2, and the modulator comprising tubes V1, V2 will contribute carrier to the output. Movement of sliders 18 and 19 to the right similarly unbalances tube V3 with respect to V4, so that the modulator comprising tubes V3, V4 will also contribute carrier to the output. Since both balanced modulators are unbalanced equally, the cancellation of the unwanted sideband will not be affected, and the output will contain carrier and the wanted sideband only. The extent of the unbalance will control the amount of carrier inserted.

While the invention has been described as applied to a grid modulation system, it is equally applicable to plate or screen modulation. Also, instead of adjusting the potential of the control grids, the transconductance of the tubes could be adjusted by unbalancing the screen voltages. Many other modifications will occur to one skilled in the art.

I claim:

1. In a single sideband modulating system which comprises two balanced modulators of two tubes each, means for injecting carrier into the output, comprising: means for increasing the direct potential of one electrode of one tube in each modulator and means for simultaneously decreasing the direct potential of one electrode of each of the remaining two tubes.

2. In a double balanced modulating system of the type which normally suppresses the carrier and one sideband and which comprises a first balanced modulator including first and second electronic tubes and a second balanced modulator including third and fourth electronic tubes, apparatus for injecting an adjustable amount of carrier into the output without injecting the unwanted sideband, comprising: first biasing means for adjusting the potential of one electrode of each of said first and third tubes; second biasing means for adjusting the potential of one electrode of each of said second and fourth tubes; and means for simultaneously adjusting said first and second biasing means so that the potential on said first and third tubes is increased while the potential on said second and fourth tubes is decreased.

3. A double balanced modulating system comprising: a first balanced modulator comprising first and second electronic tubes; a second balanced modulator comprising third and fourth electronic tubes; a resonant circuit connected to the anodes of all four of said tubes; first biasing means for adjusting the potential of one electrode of each of said first and third tubes; second biasing means for adjusting the potential of one electrode of each of said second and fourth tubes; and means for simultaneously adjusting said first and second biasing means in opposite directions.

4. Apparatus for simultaneously and differentially adjusting the potential applied to two load devices comprising a source of potential, two impedances connected in series across said source, an adjustable contact on each impedance, a mechanical connection between the two contacts for providing simultaneous adjustment, said mechanical connection being such that at one extremity of motion both contacts are at the same potential, means for connecting one contact to one load device, means for connecting the other contact to the other load device, and means for connecting one terminal of said source to both load devices.

5. Apparatus for simultaneously and differentially adjusting the potential of two load devices comprising: a source of potential; two equal impedances with connections at their extremities and adjustable contacts; mechanical means connecting said contacts for simultaneous movement; means connecting the extremities of said impedances in series across said source so that at one limit of movement of said contacts, said contacts will be at the same potential; means connecting one contact to one load device and the other contact to the other load device; and means connecting one terminal of said source to both load devices.

JOHN F. HONEY.

References Cited in the file of this patent

UNITED STATES PATENTS

| Number | Name | Date |
|---|---|---|
| 2,424,971 | Davey | Aug. 5, 1947 |
| 2,434,904 | Busignies | Jan. 27, 1948 |